(12) United States Patent
White et al.

(10) Patent No.: US 8,205,160 B2
(45) Date of Patent: Jun. 19, 2012

(54) GRAPHICAL USER INTERFACE FOR MULTI-FRAME PRESENTATION

(75) Inventors: Cheryl S. White, Kirkland, WA (US); Douglas W. Herman, Issaquah, WA (US); Casey A. Anderson, Tukwila, WA (US); Bartosz Gulik, Seattle, WA (US); Patrick Schreiber, Sammamish, WA (US); Ravipal Soin, Kirkland, WA (US); Robert S. Dietz, Bellevue, WA (US); Hana Kim, Seattle, WA (US); David Matthew Snow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 12/119,488

(22) Filed: May 12, 2008

(65) Prior Publication Data

US 2009/0282364 A1    Nov. 12, 2009

(51) Int. Cl.
*G06D 3/00* (2006.01)
(52) U.S. Cl. ......... 715/731; 715/730; 715/732; 715/208
(58) Field of Classification Search .................. 715/763, 715/730–732, 208
See application file for complete search history.

(56) References Cited

U.S. PATENT DOCUMENTS

| | | | |
|---|---|---|---|
| 5,072,412 A | 12/1991 | Henderson et al. | |
| 5,739,821 A | 4/1998 | Ho et al. | |
| 6,230,159 B1 | 5/2001 | Golde | |
| 6,266,684 B1 | 7/2001 | Kraus et al. | |
| 6,546,558 B1 * | 4/2003 | Taguchi | 725/135 |
| 6,968,536 B2 | 11/2005 | Jazdzewski | |
| 7,290,205 B2 * | 10/2007 | Moncsko et al. | 715/208 |
| 2004/0260427 A1 | 12/2004 | Wimsatt | |
| 2005/0034056 A1 | 2/2005 | Rubin et al. | |
| 2005/0138567 A1 | 6/2005 | Smith et al. | |
| 2006/0230335 A1 | 10/2006 | Fischer | |
| 2007/0055782 A1 | 3/2007 | Wright et al. | |
| 2007/0209004 A1 * | 9/2007 | Layard | 715/731 |
| 2008/0262983 A1 * | 10/2008 | Chan et al. | 706/11 |
| 2008/0270444 A1 * | 10/2008 | Brodie et al. | 707/102 |

OTHER PUBLICATIONS

Bomsdorf, et al., "From Task to Dialogue Model Based on a Tool-Supported Framework", Position Paper for the CHI'99 Workshop, pp. 4.
Roth, et al., "Visage: a User Interface Environment for Exploring Information", pp. 8.
"DENIM", 2004-2005, Regents of the University of Washington, p. 2.
"Scratch", retrieved at <<http://scratch.mit.edu/>>, pp. 3.

* cited by examiner

*Primary Examiner* — Dennis Bonshock
(74) *Attorney, Agent, or Firm* — Alleman Hall McCoy Russell & Tuttle LLP

(57) ABSTRACT

A computing device configured to execute computer code to generate a graphical user interface (GUI) for creating a multi-frame presentation is provided. The generated GUI may include a canvas pane configured to display a main frame and supporting frame icons representing a plurality of supporting frames of the presentation. The generated GUI may further include a connector tool operable within the canvas pane for creating a link between a source element and a target element, the source element being the main frame or an element of the main frame, the target element being a supporting frame or an element of a supporting frame, the link being defined by an associated linking script, the connector tool being operable to create the link via a click-and-drag action from the source element to the target element.

19 Claims, 9 Drawing Sheets

SOURCE ELEMENT: FRAME 1 /-32   /-42
EVENT: CLICK /-56

LINKING CONDITION: IF QUIZ SCORE > 65
        63 65 66 68 70

LING ACTION: GO TO
       60

LINKING TARGET: FRAME 2
        34

GRAPHICAL USER INTERFACE FOR MULTI-FRAME PRESENTATION

BACKGROUND

Presentation authoring programs have been utilized to create interactive frame-based presentations that integrate a range of multimedia resources that may be linked by hyperlinks. One issue often encountered by authors when using such programs is that it can be difficult to visualize and utilize resources in different locations within a presentation. For example, to create a hyperlink in a frame to a resource located outside of the frame, in prior presentation authoring programs a user had to enter the link destination via a popup window, by manually typing in a path and name of a target resource, by browsing a file system to select a target resource, or browsing an outline of the presentation in the pop up window for the target resource. This process of defining hyperlinks through the use of pop-up windows is time consuming and can decrease productivity, resulting in a less than desirable user experience.

SUMMARY

Devices and methods for creating a multi-frame presentation are provided herein. One example of such a device includes a computing device configured to execute computer code to generate graphical user interface (GUI) for creating the multi-frame presentation, the generated GUI including a canvas pane configured to display a main frame and supporting frame icons representing a plurality of supporting frames of the presentation. The generated GUI may further include a connector tool operable within the canvas pane for creating a link between a source element and a target element, the source element being the main frame or an element of the main frame, the target element being a supporting frame or an element of a supporting frame, the link being defined by an associated linking script, and the connector tool being operable to create the link via a click-and-drag action from the source element to the target element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
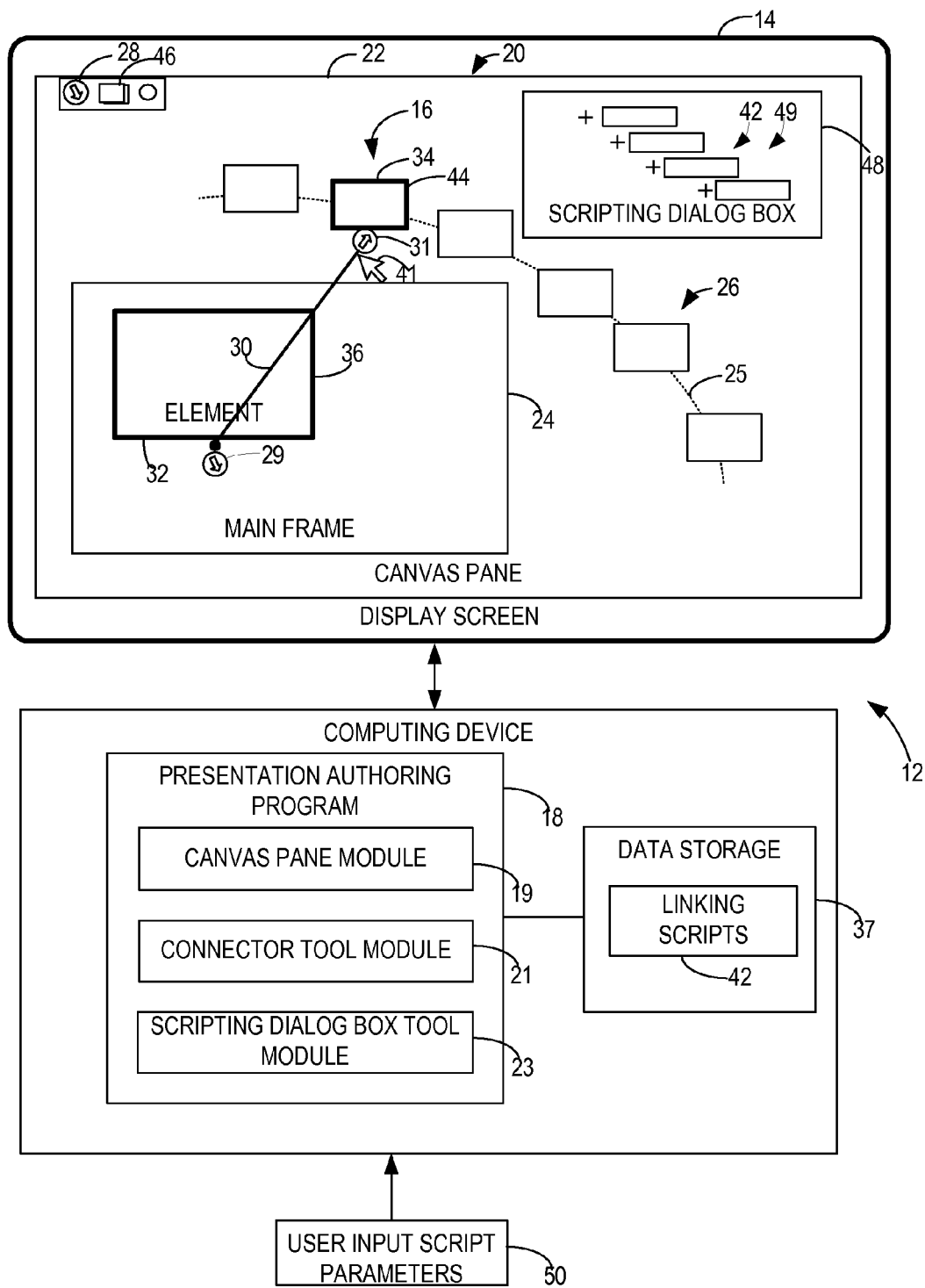
FIG. 1 is a schematic view illustrating an embodiment of a computing device that is configured to execute computer code to generate a graphical user interface for creating a multi-frame presentation, the graphical user interface including a canvas pane for displaying the presentation and a connector tool for creating a link between a source element and a target element in the multi-frame presentation.

FIG. 1 illustrates an example computing device 12 having an associated display screen 14 for creating a multi-frame presentation 16. The computing device 12 may be configured to execute computer code in the form of a presentation authoring program 18 to generate a graphical user interface (GUI) 20 for creating the multi-frame presentation 16. The multi-frame presentation may be a slide based presentation with each slide serving as a frame of the presentation, for example. The GUI 20 may include a canvas pane 22 configured to display the presentation 16, a connector tool 28 configured to creating a link 30 of the presentation 16, and a scripting dialogue box tool 46 for generating a dynamic linking script template 48 that may be used to generate a linking script 42 defining the link 30 of the presentation 16.

The presentation authoring program 18 may further include various modules, such as a canvas pane module 19 for executing the canvas pane 22, a connector tool module 21 for executing the connector tool 28, and a scripting dialog box tool module 23 for executing the scripting dialogue box tool 46. The presentation authoring program 18 may further include an associated data storage 37 for the storing linking scripts 42 generated by the scripting dialog box tool 46.

Figure 2:
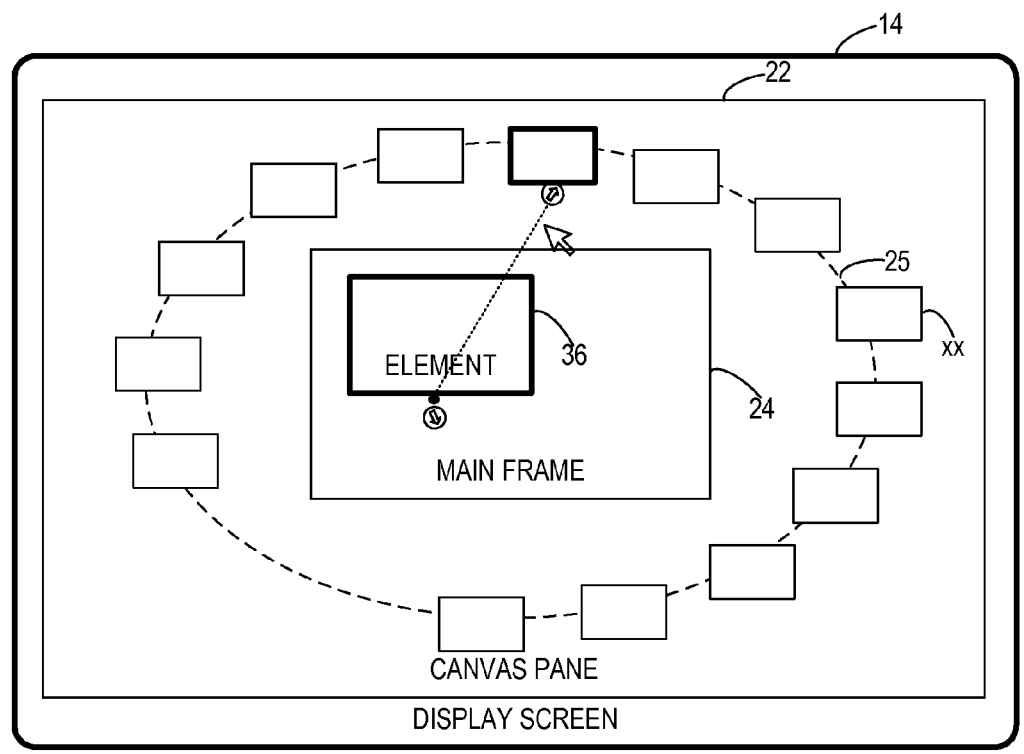
FIG. 2 is a schematic view of the canvas pane of FIG. 1, showing supporting frame icons representing a plurality of supporting frames of the presentation arranged in an oval path.
Figure 3:
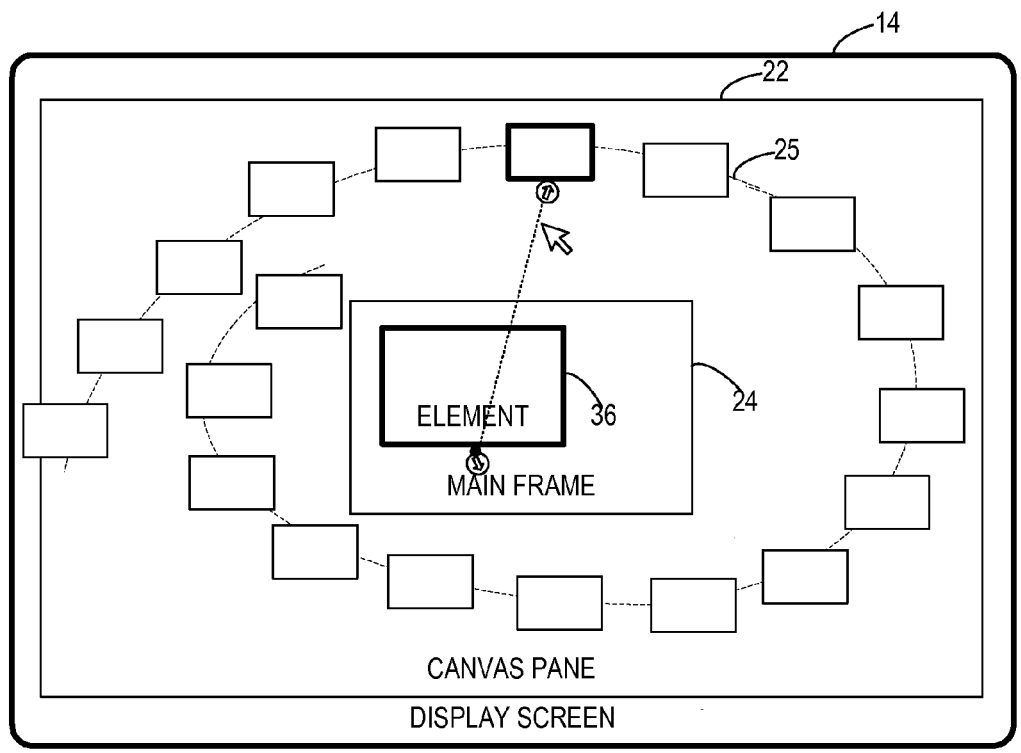
FIG. 3 is a schematic view of the canvas pane of FIG. 1, showing supporting frame icons representing a plurality of supporting frames of the presentation arranged in a spiral path.

The canvas pane 22 may be configured to display a main frame 24 and supporting frame icons 26 representing a plurality of supporting frames 27 of the presentation 16, displayed in presentation order along a path 25. Typically the path is configured such that all supporting frame icons 26 are visible, although other configurations are possible. The main frame 24 may be displayed to one side of the canvas pane, as depicted in FIG. 1, or in an intermediate region of the canvas pane 22, as depicted in FIG. 2. The path 25 may be for example a curved path as shown in FIG. 1, an oval path as shown in FIG. 2, or spiraling path as shown in FIG. 3. The supporting frame icons 26 and the path 25 may rescale based on the total number frames included in the supporting frames 27. Thus, the distance between supporting frame icons 26 in the oval path of FIG. 2 may decrease as supporting frames are added, or the number of loops in the spiraling path of FIG. 3 may increase as supporting frames are added, to enable supporting frame icons 26 for all supporting frames in the presentation to be displayed.

Continuing with FIG. 1, the GUI 18 may further include a connector tool 28 operable within the canvas pane 22 for creating a link 30 between a source element 32 and a target element 34, the source element 32 being the main frame 24 or an element of the main frame 36, the target element 38 being a supporting frame 27 or an element of the main frame 36. The link 30 may be defined by an associated linking script 42, which as discussed above may be stored in the data storage 37 of the computing device 12.

The linked frames may be differentiated from frames that are not linked using a graphical differentiator 44, which in the depicted embodiment is a bold outline box, but which alternatively could be another suitable graphical element. The connector tool 28 may be configured to display a link source icon 29 at the source element 32 and a link target icon 31 at the target element 34, so that a user may visually identify the source and target frames that are linked by link 30. The connector tool 28 may be configured to display a graphical connecting element 33, such as a line, between the link source icon 29 and the link target icon 34, to further visually identify the source and target frames that are linked. The connecting element may be configured to be displayed, for example, upon mouse over of the link source icon 29 or link target icon 31. The link source icon 29 and/or the link target icon 31 may rotate to align with the graphical connecting element 33. In one particular example, the graphical connecting element 33 may be a line linking the link source icon 29 and the link target icon 31 and the link target icon 32 each includes an arrow. In such example, the orientation of the arrow of link target icon 31 may programmatically rotate to align with the line linking the link source icon 29 and the link target icon 31.

Figures 4, 5:
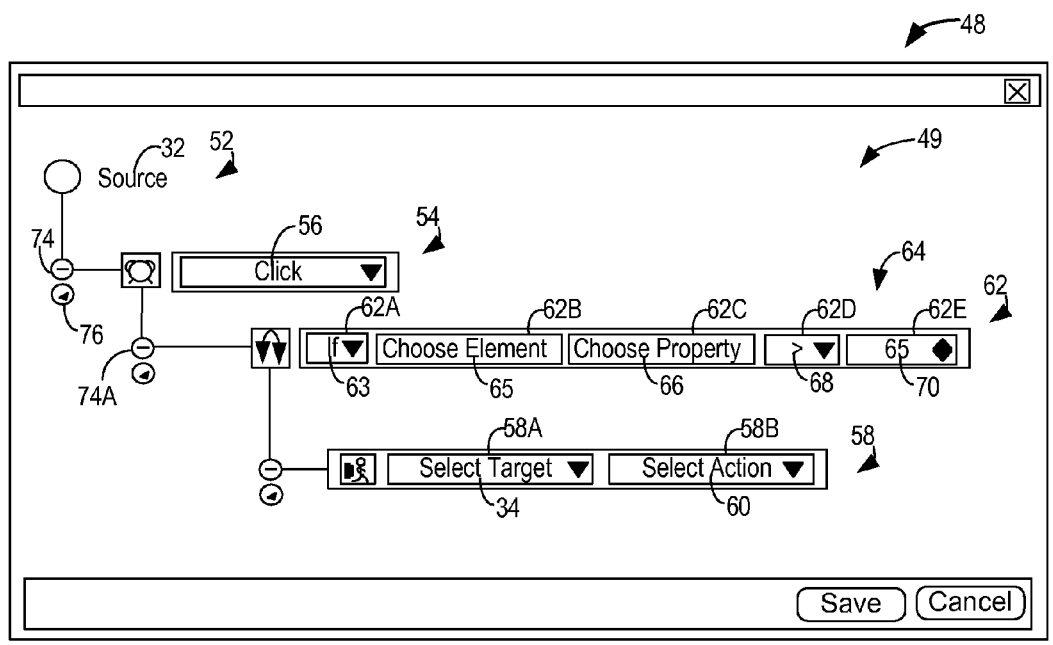
FIG. 4 is a textual representation of an example linking script defining a link created by the computing device of FIG. 1.
FIG. 5 is an example dynamic linking script template generated by a scripting dialogue box tool of the computing device of FIG. 1, for generating a linking script defining a link between a source element and a target element in the multi-frame presentation, such as the linking script of FIG. 4.

An example linking script 42 is shown in FIG. 4. The associated linking script 42 generated may specify the selected source element 32 as a source of the link 30 and the selected target element 34 as a target of the link 30. The linking script 42 may further specify a default event, such as a default event specified in an element description file of the source, as an event 56 upon occurrence of which a linking action 60 linking the selected source element 32 and the selected target element 34 is to be performed. If no default event is specified in the element description file of the source element 32, the connector tool 28 may programmatically set "click" as the event 56 of the link 30. If no default event is specified and additionally "click" is not an allowable event of the source element 32, the connector tool 28 may programmatically cause a scripting dialogue box tool 46 to display a dynamic linking script template 48 for user input. The scripting dialogue box tool 46 and the dynamic linking script template 48 will be discussed in further detail later. However, if the selected source element 32 does not specify any allowable events 56, the connector tool 28 may be inactivated for the source element 32 and the connector tool 28 or may not appear for the source element 32.

Continuing with FIG. 1, the scripting dialogue box tool 46 may be configured to display a dynamic linking script template 48 for creating and modifying the linking script 42 of a link 30, where the dynamic linking script template 48 is configured based on a selected source element 32 and target element 34 of the link 30, and where the script dialogue box tool 46 is configured to receive user input script parameters 50 to produce the linking script 42 based on the linking script template 48. By way of example, the linking script template 48 may be displayed when a user performs one of the following actions: selecting the scripting dialogue box tool 46, double clicking on the link source icon 29 or the link target icon 31, or creating an additional link 30 of the source element 32 in addition a first link from the source element 32 via a click-and drag action. Other suitable mechanisms for displaying the linking script template 48 may also be provided.

FIG. 5 illustrates an example dynamic linking script template 48 generated by the scripting dialogue box tool 46. As shown in FIG. 5, the linking script template 48 may include a plurality of scripting blocks 49, such as a source block 52 for specifying the source element 32 of the link 30, an event block 54 for indicating the event 56 triggering the link 30, a conditional block 62 for indicating one or more linking conditions 64 under which one or more linking actions 60 are to be performed, and an action block 58 for indicating a linking actions 60 to be taken upon traversal of the link 30 linking the source element 32 to a target element 34.

The linking script template 48 may also include a plurality of sub-scripting blocks 49. For example, the action block 58 may include a target sub-scripting block 58A for specifying the target element 34 of the link 30, and an action sub-scripting block 58B for specifying the linking action 60 to performed linking the selected source element 32 to the selected target element 34. The conditional block 62 may include a conditional statement sub-scripting block 62A for specifying the conditional statement 63. The conditional block 62 may further include various sub-scripting blocks, such as element sub-scripting blocks 62B, a property sub-block 62C, an operator sub-scripting block 62D, and a value sub-scripting block 62E for specifying the conditional statement 63, element 65, property 66, operator 68, and value 70, respectively, of a linking condition 60.

Individual scripting blocks 49 may be programmatically defined to be user editable or user un-editable, as appropriate. In one particular example, the source block 52 may be a user un-editable block, while the event block 54, the conditional block 62 and the action block 58 may be user editable blocks. Whether one of the plurality of scripting blocks 49 is user editable or un-editable may vary depending on the selected source element 32 and/or the selected target element 34. In one particular example, the event block 54 may be an un-editable block that is programmatically filled with "click", when the selected source element 32 is the main frame 24 and the selected target element 34 is a supporting frame 27.

Each of the plurality of scripting blocks 49 may include an expansion selector 74 for expanding or collapsing sub-blocks of the scripting block 49. For example, if the user clicks on the "−" icon of the illustrated expansion selector 74A, to the left of the conditional statement 64, all nested sub-blocks of the conditional block 62 may be collapsed and the "−" icon will turn into a "+" icon. Each of the plurality of scripting blocks 49 may also include a menu icon 76 for adding or removing a block of the same kind.

The plurality of scripting blocks 49 of the dynamic linking script template 48 may be programmatically filled based on the selected source element 32 and the target element 34. For example, the source block 52 may be programmatically filled based on an identity of the source element 32; the event block 54 may be programmatically filled with selection options based on allowable events of the source element 32; the conditional block 62 may be programmatically filled with selection options selected from the group consisting of conditional statement 63, element 65, property 66, operator 68, and/or value 70 of the linking condition 64; and the action block 58 may be programmatically filled with selection options based on the target element 34. In one particular example, the source block 52 may be programmatically filled with identity of the selected source element 32; the event block 54 may be programmatically filled with a default event of the selected source element 32 specified, for example, in an element description file of the source element 32, or programmatically filled with "click" if no default event is specified and "click" is an allowable event of the source element 32, or programmatically filled with a first event of a selection of allowable events; the conditional block 62 may be programmatically filled with conditional statements 63 that are logical, while leaving the element 65, property 66, operator 68, and value 70 to be filled by the user; and the action block 58 may be programmatically filled with the selected target element 34 and a default linking action 60.

To promote a more seamless user authoring experience, and decrease input errors, the presentation authoring program 18 may be configured to determine appropriate selection options for the conditional statement 63, the element 65, the property 66, the operator 68, and/or the value 70 and programmatically fill the determined selection options in the corresponding dropdown menus. One example of a set of rules by which the appropriate selection options may be determined is listed below. Other sets of rules may alternatively be adopted.

i. The first conditional statement can be "always" or "if". The default is "always".
   ii. If the first conditional statement is "always", the user cannot add another conditional statement. In the menu icon, the "Add conditional" selection will be disabled.
   iii. If the first conditional statement is "if", the user then can add another conditional statement.
   iv. One "if" block is allowed per event and it is specified to be the first block; therefore, "if" will not appear in the dropdown for subsequent conditional statements.
   v. The user can add as many "else if" statements as she would like as long as it comes after "if" and before "else" by using the menu icon by the "if" block or an existing "else if" block.
   vi. Only one "else" block is allowed per event and it has to be the last one. No conditional block can be added after the "else" block; in the menu icon for the "else" block, "Add Conditional" will be disabled.
   vii. The last existing conditional block has "else" in the drop down. viii. Each conditional statement can have one condition. In this example a statement like "If (x>5) & (y<5)" is not supported.

The following list illustrates one example set of recognized conditional statements 63. Other embodiments may alternatively include a different set of recognized conditional statements.

i. Always
   ii. If
   iii. If/else if
   iv. If/else if/else
   v. If/else if/else if/else Furthermore, the selection options for one or more sub-scripting blocks may be programmatically adjusted according to previous sub-scripting blocks that have been filled. For example, the selection options provided for one or more of sub-scripting blocks for specifying the element 65, the property 66, the operator 68, and/or the value 70 may be programmatically adjusted according to a previous sub-scripting block that has been filled. In one particular example, a dropdown containing selection options for all elements 65 on the current main frame 24 may be displayed for the user to select.

Once the user selects the element 65, a dropdown containing selection options for all properties 66 of the selected element 65 may be displayed for the user to select. Once the user selects the property 66, a dropdown containing selection options for appropriate operators 68 for the selected property may be displayed for the user to select. Once the user selects the operator 68, a dropdown containing values 70 that are appropriate for the selected property 66 may be displayed for the user to select. Examples of appropriate operators 68 for various types of properties 66 are illustrated the table below. It will be appreciated that other operators 68 may be utilized as appropriate.

| PROPERTY TYPE | OPERATORS SUPPORTED |
|---|---|
| Any numeric type: double, integer, etc. | Greater than, greater than or equal to, less than, less than or equal to, equal to, not equal to |
| String | Equals, not equals, contains, not contains, is blank, is not blank |
| Everything else | Equals, not equals |

Similarly, the selection options for linking actions 60 may be adjusted according to the target element 34 selected. In one particular example, once the user inputs the an target element 34, the scripting dialogue box tool 46 may cause the action block 58 to display a selection of linking actions 60 available for the selected target element 34 in a dropdown and prompt the user to enter or select the linking action 60 from the dropdown.

Figure 6:
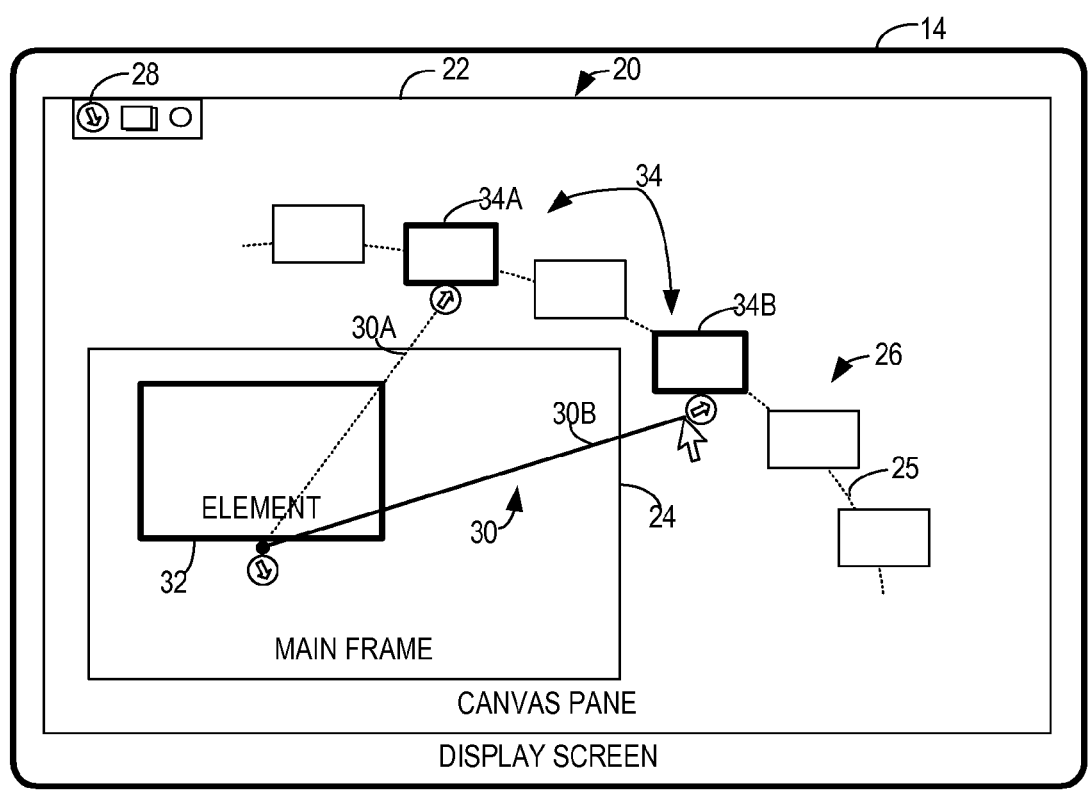
FIG. 6 is a schematic view of the canvas pane of FIG. 1, showing creation of a second link via a click-and-drag action using the connector tool.

As shown in FIG. 6, additional links 30 may be created from a source element 32 to different target elements 34 via a click-and-drag action using the connector tool 28. In such instances, the conditional block is a branching conditional block having each branch of the branching conditional block corresponding to a link to a target element 34. The conditional statements 64 may be programmatically filled for each branch according to the number and the sequence of the branch as it appears in the dynamic linking script template 48. In one particular example, the link 30 may be a first link 30A from a source element 32 to a first target element 34A, the connector tool 38 may be further configured to create a second link 30A via a click-and-drag action from the source element 32 to a second target element 34B. In such instances, the conditional block is a branching conditional block that branches to the first link 30A and the second link 30B, and the script dialogue box tool 46 may programmatically open a linking script template 48 when the second link 30b is created.

Figure 7:
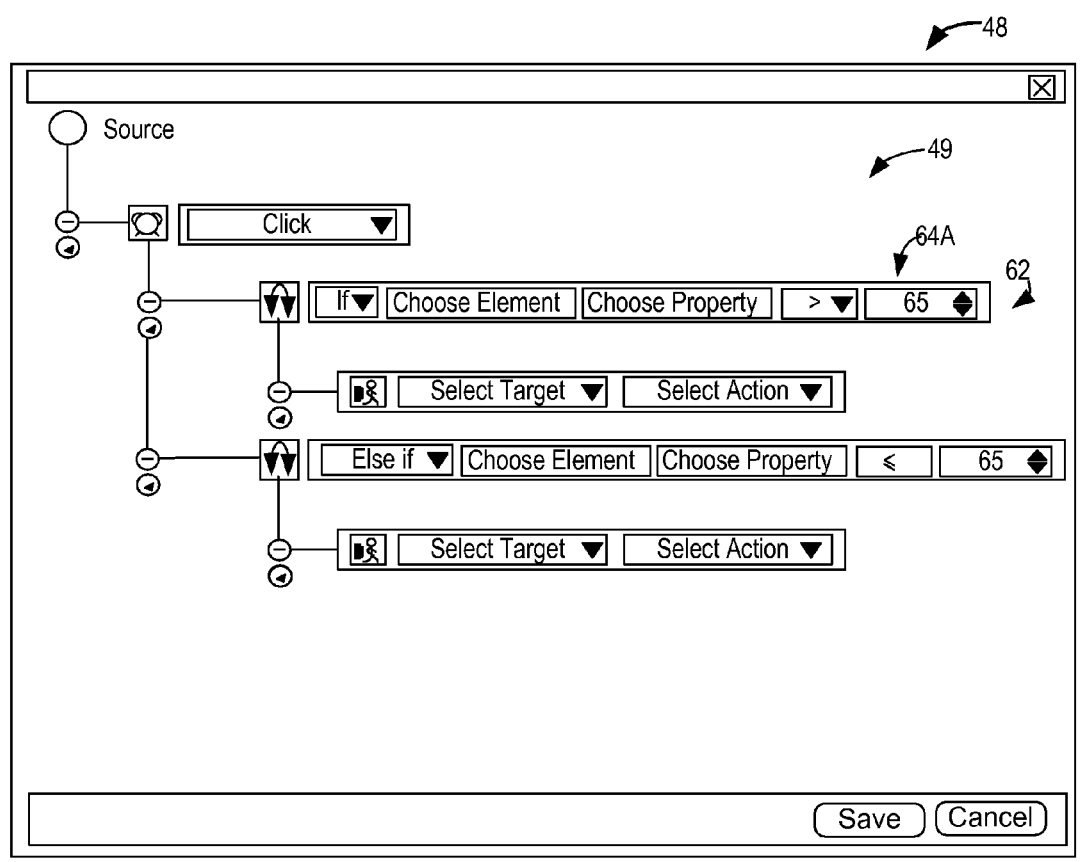
FIG. 7 is an example linking script template with a branching conditional block.

FIG. 7 is an example linking script template 48 illustrating a branching conditional block 62. A first conditional statement 64A for the first link 30A illustrated in FIG. 6 may be programmatically filled with a conditional statement "if"; and the second conditional statement 64B for the second link 30B may be programmatically filled with a conditional statement "else".

The connector tool 28 may be further configured to perform one or more additional linking actions, such as linking to self, moving an existing link, deleting a link, and modifying a link, as illustrated in the Figures discussed below.

Figure 8:
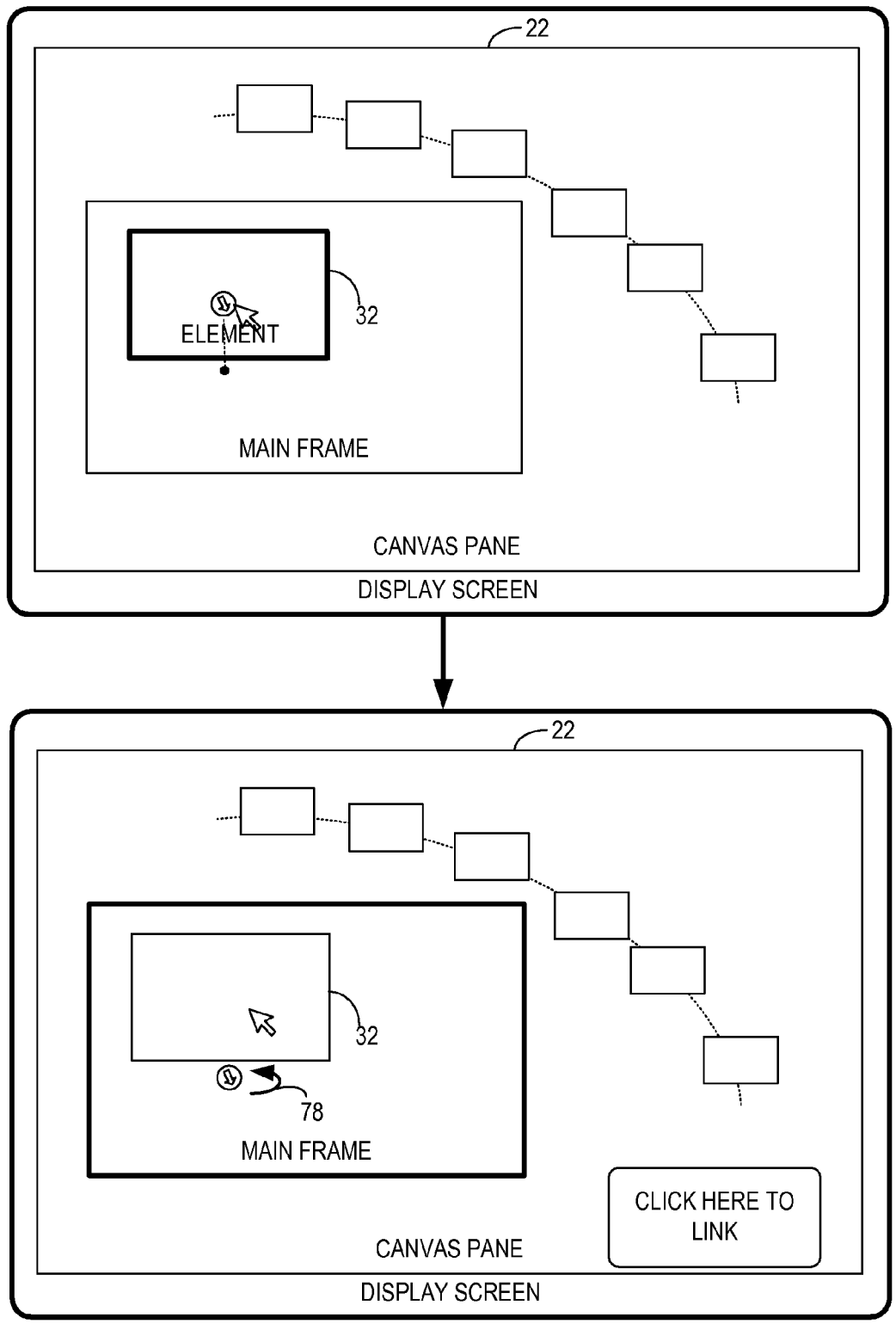
FIG. 8 is a schematic view of the canvas pane of FIG. 1, showing creation of a self-link via a click-and-drag action.

As shown in FIG. 8, to perform the action of linking to self, the user may click on a link source icon by the source element 32 and drag it inside the source element 32. A self-link icon 78 may appear by the source element 32 to denote that a self-link has been created.

Figure 9:
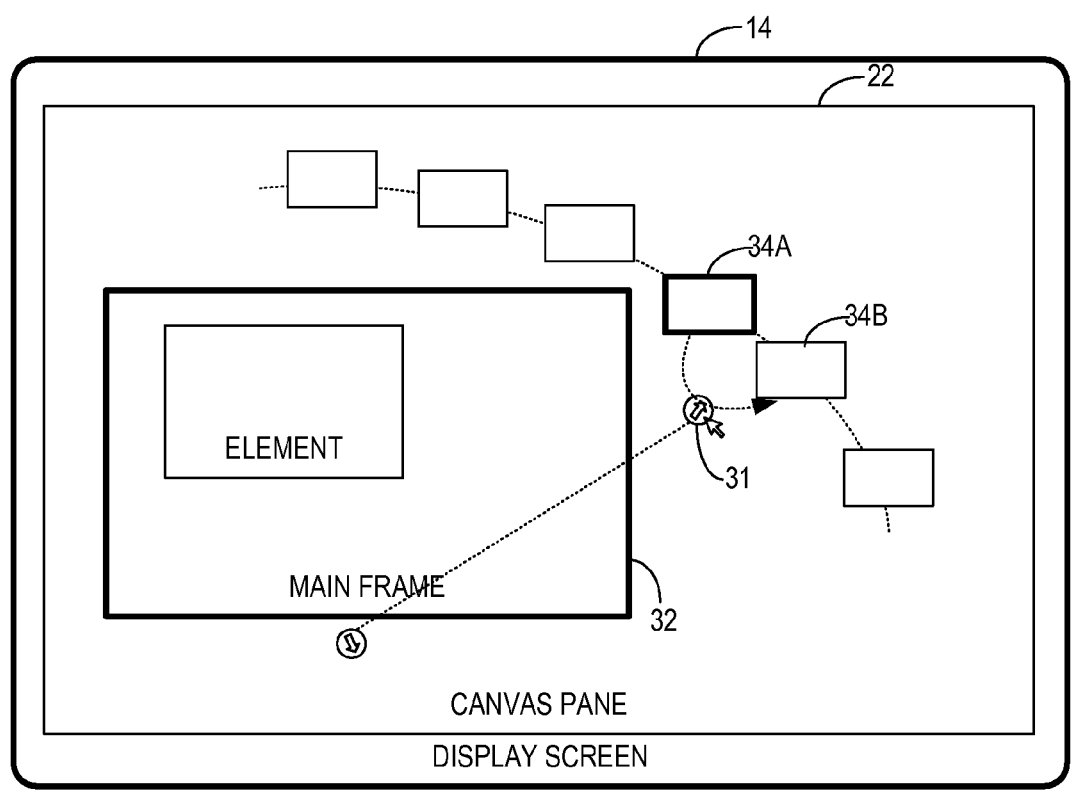
FIG. 9 is a schematic view of the canvas pane of FIG. 1, showing movement of an existing link via a click-and-drag action.

As shown in FIG. 9, to perform the action of moving an existing link from a first target element 34A to a second target element 34B, the user may simply click on a link target icon 31 and drag it from the first target element 34A to the second target element 34B, along the illustrated path. The moved link will be formed between the source element 32 and the second target element 34.

Figure 10:
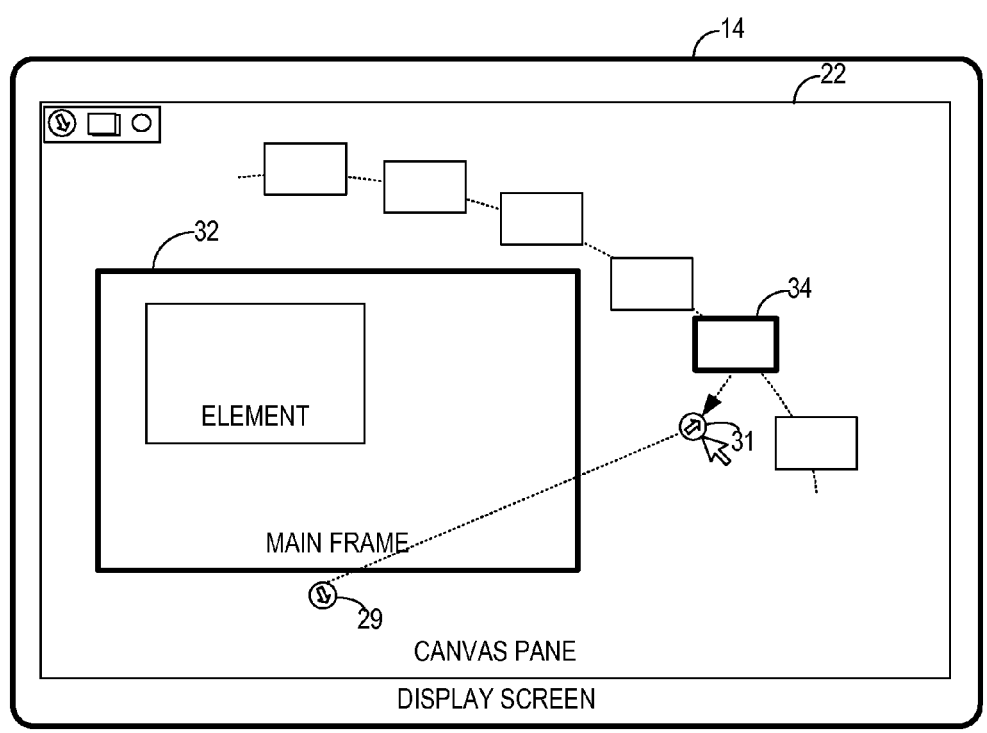
FIG. 10 is a schematic view of the canvas pane of FIG. 1, showing deletion of an existing link via a click-and-drag action.

As shown in FIG. 10, to perform the action of deleting an existing link from a source element 32 to a target element 34, the user may click on the link target icon 31 of the link 30 and drag and release it into an empty space on the canvas pane 22. Further, to modify an existing link, the user may double click on either the link source icon 29 or the link target icon 31, and in response the connector tool 28 may cause a dynamic linking script template 48, as illustrated in earlier Figures, for modifying the existing link.

Figure 11:
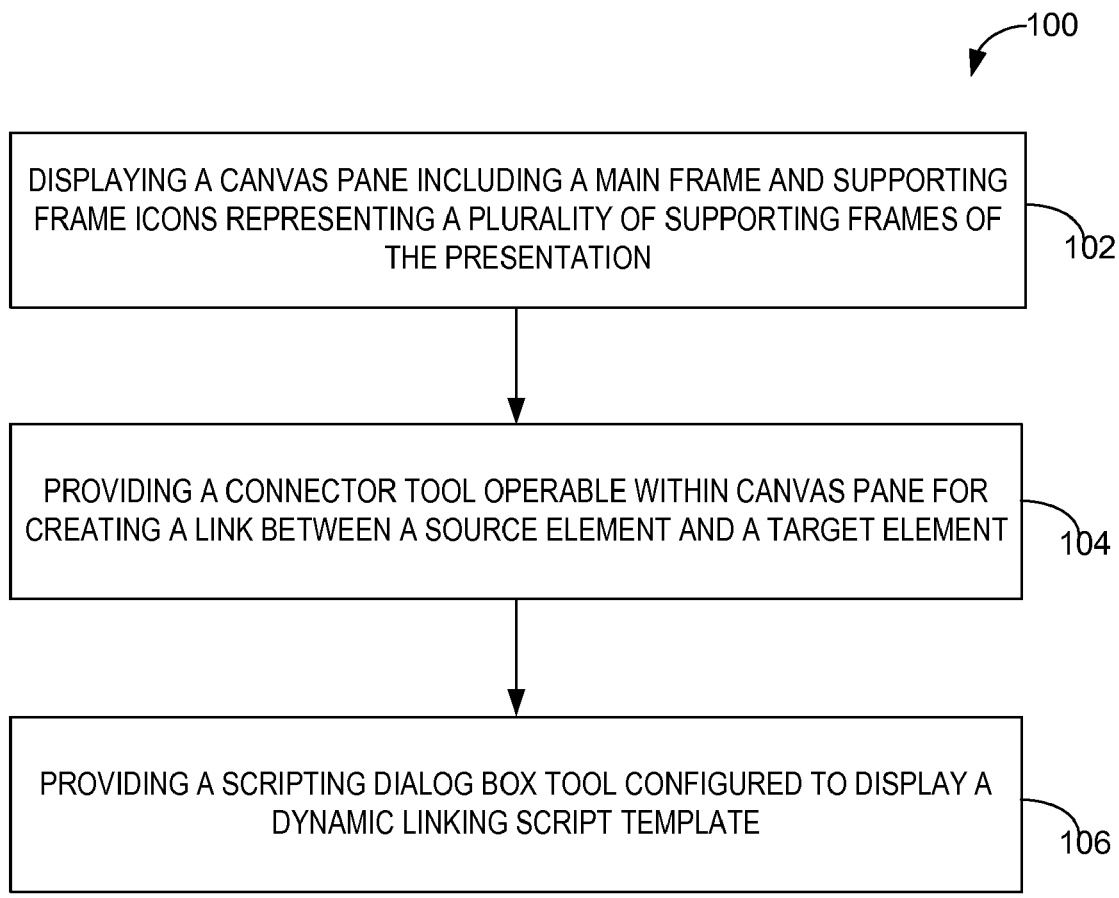
FIG. 11 is a flowchart including an example method of creating a multi-frame presentation using the graphical user interface of FIG. 1.

FIG. 11 is a flowchart showing an example method 100 for creating a multi-frame presentation using the graphical user interface of FIG. 1. The method may be implemented using the hardware and software components of computing device 12 described above, or via other suitable hardware and software components.

The method may include, at 102, displaying a canvas pane including a main frame and supporting frame icons representing a plurality of supporting frames of the presentation. At 104, the method may include providing a connector tool operable within the canvas pane for creating a link between a source element and a target element, the source element being the main frame or an element of the main frame, the target element being a supporting frame or an element of a supporting frame, the link being defined by an associated linking script, and the connector tool being operable to create the link via a click-and-drag action from the source element to the target element.

At 106, the method may include providing a scripting dialogue box tool configured to display a dynamic linking script template that is configured based on the selected source element and target element, the script dialogue box tool being configured to receive user input script parameters to produce the linking script based on the linking script template.

The linking script template may include a plurality of scripting blocks and the scripting blocks may be programmatically filled based on an identity of the source element, the event block is programmatically filled with selection options based on allowable events of the source element, and the action block is programmatically filled with selection options based on the target element as discussed previously.

The above described systems and methods may enable a user to efficiently create links between source and target elements in a presentation authoring program, potentially increasing productivity and enriching the user experience.

It will be appreciated that the computing device described herein may be any suitable computing device configured to execute the programs and display the graphical user interfaces described herein. For example, the computing device may be a personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device configured to execute computer code to generate a graphical user interface for creating a multi-frame presentation, the graphical user interface comprising:
   a canvas pane configured to display a main frame and supporting frame icons representing a plurality of supporting frames of the presentation;
   a connector tool operable within the canvas pane for creating a link between a source element and a target element, the source element being the main frame or an element of the main frame, the target element being a supporting frame or an element of the supporting frame, the link being defined by an associated linking script, the connector tool being operable to create the link via a click-and-drag action from the source element to the target element; and
   a scripting dialogue box tool configured to:
      display a dynamic linking script template that is configured based on a selected source element and target element; and
      receive user input script parameters to produce a linking script based on the linking script template, the linking script template including a plurality of scripting blocks and a plurality of sub-scripting blocks.

2. The computing device of claim 1, wherein the plurality of scripting blocks includes:
   a source block for specifying the source element of the link;
   an event block for indicating an event triggering the link; and
   an action block for indicating a linking action to be taken upon traversal of the link.

3. The computing device of claim 2, wherein the source block is programmatically filled based on an identity of the source element.

4. The computing device of claim 2, wherein the event block is programmatically filled with selection options based on allowable events of the source element.

5. The computing device of claim 2, wherein the action block is programmatically filled with selection options based on the target element.

6. The computing device of claim 2, wherein the plurality of blocks further includes:
   a conditional block for indicating one or more conditional statements including conditions under which one or more linking actions are to be performed.

7. The computing device of claim 6, wherein the conditional block includes element, property, operator, and value sub-scripting blocks.

8. The computing device of claim 6, wherein the link is a first link from the source element to a first target element, the connector tool being further configured to create a second link via a click-and-drag action from the source element to a second target element.

9. The computing device of claim 8, wherein the conditional block is a branching conditional block that branches to the first link and the second link, which the linking script template is programmatically set to generate upon the creation of the second link.

10. The computing device of claim 6, wherein the action, event, and conditional blocks are configured to be user editable.

11. The computing device of claim 1, wherein the connector tool is configured to display a link source icon at the source element and a link target icon at the target element.

12. The computing device of claim 11, wherein the connector tool is configured to display a graphical connecting element between the link source icon and the link target icon, upon mouse over of the link source icon or link target icon.

13. The computing device of claim 1, wherein the supporting frame icons are displayed in presentation order along a path in the canvas pane, such that all supporting frame icons in the presentation are visible.

14. The computing device of claim 1, wherein linked frames are visually differentiated from frames that are not linked via a linking graphic.

15. The computing device of claim 1, wherein the connector tool is further configured to perform a linking action selected from the group consisting of moving a link, deleting a link, linking to self, and modifying a link.

16. A method of creating a multi-frame presentation, comprising:
   displaying a canvas pane including a main frame and supporting frame icons representing a plurality of supporting frames of the presentation;
   providing a connector tool operable within the canvas pane for creating a link between a source element and a target element, the source element being the main frame or an element of the main frame, the target element being a supporting frame or an element of the supporting frame, the link being defined by an associated linking script, the connector tool being operable to create the link via a click-and-drag action from the source element to the target element; and
   providing a scripting dialogue box tool configured to:
      display a dynamic linking script template that is configured based on a selected source element and target element; and
      receive user input script parameters to produce a linking script based on the linking script template, the linking script template including a plurality of scripting blocks and a plurality of sub-scripting blocks, the scripting blocks including a source block for specifying the source element of the link, an event block for indicating an event triggering the link, and an action block for indicating a linking action to be taken upon traversal of the link.

17. The method of claim 16, wherein the source block is programmatically filled based on an identity of the source element, the event block is programmatically filled with selection options based on allowable events of the source element, and the action block is programmatically filled with selection options based on the target element.

18. The method of claim 16, wherein the scripting blocks further include a conditional block, the conditional block including conditional statement, element, property, operator, and value sub-scripting blocks.

19. A computing device configured to execute computer code to generate a graphical user interface for creating a multi-frame presentation, the graphical user interface comprising:
   a canvas pane configured to display a main frame and supporting frame icons representing a plurality of supporting frames of a presentation;
   a connector tool operable within the canvas pane for creating a link between a source element and a target element, the source element being the main frame or an element of the main frame, the target element being a supporting frame or an element of the supporting frame, the connector tool being operable to create the link from the source element to the target element; and
   a scripting dialogue box tool configured to display a dynamic linking script template that is configured based on a selected source element and target element, the scripting dialogue box tool being configured to receive user input script parameters to produce a linking script based on the linking script template, the linking script template including an event block, a source block, an action block, and a conditional block, the event, action, and conditional blocks configured to be user editable.

* * * * *